United States Patent Office 2,805,239
Patented Sept. 3, 1957

2,805,239

CATALYTIC CARBON MONOXIDE HYDROGENATION

Walter Rottig, Oberhausen-Sterkrade-Nord, Germany, assignor to Ruhrchemie Aktiengesellschaft, Oberhausen-Holten, Germany, and Lurgi Gesellschaft fuer Waermetechnik n. b. H., Frankfurt am Main, Heddernheim, Germany No Drawing. Application November 24, 1953,
Serial No. 394,195

Claims priority, application Germany August 10, 1950

7 Claims. (Cl. 260—449.6)

This invention relates to new and useful improvements in catalytic carbon monoxide hydrogenation, and is a continuation-in-part of U. S. application Serial No. 239,844, filed August 1, 1951, now abandoned. The invention more particularly relates to the catalytic hydrogenation of carbon monoxide with the formation of synthesis products having a high content of oxygen-containing compounds.

The catalytic hydrogenation of carbon monoxide using fixed bed iron, cobalt, or nickel synthesis catalysts, is well known. The catalysts for this synthesis generally have a particle size of between 3 and 5 mm. and the synthesis product, which predominantly consists of hydrocarbons, may also contain small amounts of oxygenated compounds. Though synthesis catalysts having a particle size of less than 3 mm. diameter have incidentally been suggested for the production of hydrocarbons, it was found in practice in most cases that no additional effect with regard to conversion yield and quality of the synthesis products could be obtained with the use of these smaller catalyst granules. Further, since the smaller catalyst granules when operating in the fixed bed process could cause an increased pressure loss, it was generally believed that catalysts having a particle size above 3 mm. diameter would be most desirable. In the so-called fluidized synthesis process, as opposed to the fixed bed process, it is known to use catalysts having particle sizes of less than approximately 0.5 mm. and preferably of less than 0.2 mm. in diameter. The problems encountered in the fluidized process are, however, different from those encountered in the fixed bed process, and catalysts of this small grain size are required, so that the same will be "fluidized" by the upwardly flowing synthesis gas stream. In the fluidized state, the catalyst particles are suspended and eddied in the upwardly flowing gas stream and assume a liquid-like structure which affords an extremely good removal of the reaction heat. If in the fluidized process catalyst particles having a considerably larger diameter would be used, the same could not be maintained in the suspended fluidized state with the gas velocities required for the carbon monoxide hydrogenation. When using iron catalysts in fluidized operation, the maximum particle size allowable for trouble-free operation is approximately 0.3–0.5 mm.

In a special synthesis process known as the "synol" process for the production of synthesis products having a high content of oxygenated compounds, catalysts having a small particle size of 1–2 mm. have been used. These catalysts are formed from pure electrolytic iron or iron from iron carbonyl. The iron is oxidized, mixed with small amounts of alumina and very small amounts of alkali amounting to 0.15–0.5% $K_2O$ referred to the iron, melted, the melt broken into 1–2 mm. particles, and these particles reduced.

One object of this invention is the catalytic hydrogenation of carbon monoxide with production of synthesis products containing at least 30% and preferably more than 45% of oxygenated compounds. This, and still further objects, will become apparent from the following description:

In accordance with the invention, the synthesis is effected at pressures ranging above 5 atmospheres and preferably above 10 atmospheres with the use of fixed bed iron catalysts. The catalysts used in accordance with the invention, contain at least 5%, and preferably 5–8.5% of alkali calculated at $K_2O$ and referred to the iron present, and have a particle size below 2 mm. and preferably between 0.5 and 1.9 mm. The range of particle size of the catalysts is kept as narrow as possible, and the catalyst, prior to contacting with the carbon monoxide hydrogen-containing synthesis gas, is reduced with reduction gas at flow velocities of at least 60 cm. per second, calculated under normal conditions, and at temperatures of between 200–350° C.

As compared with the use of larger catalyst grains, it is possible, in accordance with the invention, to considerably decrease the synthesis temperature, thereby favorably influencing the life and activity of the catalyst as well as reducing the methane formation. Variations in the range of the particle size should be maintained as narrow as possible. The more uniform the particle size of the catalyst used, the more favorable the effects obtained in the synthesis.

By using the catalysts having a particle size below 2 mm. with a relatively narrow range in particle size variation, a surprising and considerable increase in the formation of oxygenated compounds and preferably alcohols is effected as compared with the use of catalysts of the same composition, but with a particle size in excess of 2 mm. in diameter. Particle sizes of below 0.5 mm. have not proved suitable in practice since the gas passage through the catalyst layer is difficult when using catalyst particles of this size which are partially present in the form of dust. The process according to the invention is with particular advantage effected with the use of catalyst particle sizes of 0.5–1 mm. Particle sizes of 1.0–1.5 mm. are also suitable. The particle size desired is obtained by using corresponding sieves.

Very surprisingly, this effect of an increase in the content of oxygen compounds caused by the use of catalysts having a particle size below 2 mm., is specific to catalysts which contain at least 5% and preferably 5–8.5% of alkali calculated as $K_2O$ and referring to the iron content. If, for example, catalysts are used which have a low alkali content, as, for example, 0.15%–0.5% $K_2O$, this effect will not occur, or will only occur to a very minor extent. Alkali contents in excess of 15% $K_2O$ show no advantages. The process has particularly improved with the use of sodium and potassium as alkali metals. However, it is not limited to the use of these alkali metals.

An alkali content of at least 5%, and preferably 5–8.5% alkali calculated as $K_2O$ means that an amount of the particular alkali used should be present in the catalyst which is equivalent to at least 5%, and preferably 5–8.5% by weight of $K_2O$ with respect to the iron content of the catalyst.

In accordance with the invention, the synthesis should be effected at super-atmospheric pressures, preferably between 10 and 70 atmospheres pressure. It is, however, possible to use higher synthesis pressures. The synthesis may be effected at temperatures between 150° and about 300° C. and preferably of 180°–250° C.

The synthesis, in accordance with the invention, should be effected with a gas load of the catalyst of about 10 liters up to more than 1000 liters of gas per liter of catalyst per hour. Gas loads of above 2000 liters per liter of catalyst per hour have been found to be of little advantage. It is preferable to operate with a recycling of the synthesis gas with a portion of the tail gas being returned to the synthesis reactor. In this manner, a considerably more uniform heat removal may be obtained than with a straight gas passage. Most favorable operation is obtained with a recycle ratio of 1 part by volume of fresh gas to 2–4 parts by volume of recycle gas.

It is of advantage, and particularly when using catalysts having a particle size of about 0.5–1 mm. diameter to pass the synthesis gas upwardly through the reactor. Obstructions of the catalyst tubes may incidentally occur when using the small particle size in accordance with the invention when passing the gas in the conventional downward direction. These difficulties may be overcome without changing the synthesis properties of the catalyst by conducting the gas stream upwardly through the fixed bed catalysts.

The preparation of the catalysts in accordance with the invention, having a diameter of less than 2 mm. may be effected in any manner. If precipitated catalysts are used, for example, the catalysts may be precipitated from an iron salt solution such as an iron nitrite solution with the use of boiling alkali. The moist catalyst mass can then be molded into the desired particle size by means of devices known per se, as, for example, by means of a straining sieve. This method of molding may also be used with catalysts which are produced by the decomposition of metal compounds, as, for example, nitrates.

Fused and sintered catalysts may also be used in accordance with the invention. These catalysts are mechanically crushed to the desired particle size and then sieved.

It is of prime importance in the production of the catalysts in accordance with the invention that the reduction be effected with high reduction gas flow velocities of at least 60 cm. per second, measured linear and under conditions of normal temperature and pressure, and preferably 60–150 cm. per second, and at temperatures between 200 and 350° C. Hydrogen, mixtures of hydrogen and carbon monoxide, and carbon monoxide alone and preferably hydrogen-rich gases or hydrogen alone are used as reduction gases.

The following examples are given by way of illustration and not limitation:

*Example 1*

A catalyst containing 100 parts by weight of iron (Fe), 5 parts by wt. of copper (Cu), 10 parts by wt. of calcium oxide (CaO) and 10 parts by wt. of kieselguhr was prepared by precipitation from a solution of corresponding metal nitrates by means of boiling soda solution. After the precipitation, the pH value was 9.2. The precipitated mass was immediately thereafter given into a filter press and filtered off from the mother liquor. The filter cake was partially washed with distilled water (condensed water) to a residual alkali content which, calculated as $K_2O$ and referring to the iron content, amounted to 8.5% $K_2O$. The partially washed mass was predried to a residual water content of 60% $H_2O$ and molded to granules of 1.9 mm., 3.1 mm., and 5 mm. diameter, respectively, by means of an extruding press of usual construction. The catalyst granules were reduced at 300° C. with hydrogen in such a manner that 80% of their iron content was present in the form of metallic iron.

The reduced catalysts, separated by individual particle sizes, were filled into three separate synthesis tubes. These synthesis tubes consisted of a double tube with the annular space between the tubes having a width of 10 mm. The length of the double tubes was 4.5 m. In all of the three tubes the synthesis was effected in such a manner that 150 parts by volume of water gas per part by volume of catalyst were hourly charged, and, moreover, 2.5 parts by volume of tail gas were admixed for every part by volume of fresh gas. The synthesis pressure was 10 kilos per square cm.

After 300 and 600 operating hours, respectively, the yield of oxygenated compounds, the rate of conversion and the synthesis temperature reach the values shown in the following table:

AFTER AN OPERATING TIME OF 300 HOURS

| Catalyst particle size, mm. | Synthesis temperature, °C. | $CO+H_2$ Conversion, Percent | Oxygenated compounds, Percent | Methane formation, Percent |
| --- | --- | --- | --- | --- |
| 1.9 | 195 | 53 | 53 | 3 |
| 3.1 | 195 | 44 | 49 | 6 |
| 5.0 | 195 | 40 | 48 | 11 |

AFTER AN OPERATING TIME OF 600 HOURS

| 1.9 | 210 | 53 | 50 | 10 |
| --- | --- | --- | --- | --- |
| 3.1 | 215 | 48 | 46 | 11 |
| 5.0 | 225 | 50 | 44 | 14 |

In the course of continued operation it became apparent that the lifetime of the catalysts according to the invention exceeded that of the catalysts molded to 3–5 mm. by several months.

*Example 2*

A catalyst consisting of 100 parts by weight of iron (Fe), 5 parts by weight of copper (Cu), 10 parts by weight of kieselguhr, and 5 parts by weight of $K_2O$ (added in the form of $K_2CO_3$) was prepared in four different grain sizes of 0.5–1 mm., 1–2 mm., 2–3 mm. and 3–4 mm. The reduction of the catalyst was carried out at about 300° C. with hydrogen at high gas velocities (1.5 m. per second) until the catalyst contained 80% of its iron content in the form of metallic iron. A comparison was made between these four catalysts at a gas load of hourly 1000 parts by volume of gas per part by volume of catalyst and at a synthesis pressure of 200 kilos per square cm. with straight gas passage.

After an operating time of 200 hours, the following results were obtained at 218° C.:

| Particle size, mm. | $CO+H_2$ conversion, percent | CO conversion, percent |
| --- | --- | --- |
| 0.5–1 | 52 | 69 |
| 1.0–2 | 41 | 52 |
| 2.0–3 | 31 | 41 |
| 3.0–4 | 31 | 41 |

While a satisfactory conversion could not be reached at all with the catalyst grains of a size of more than 2 mm. in spite of a further temperature increase by approximately 30° C., a good CO conversion over an extended period of time could be obtained with the 1–2 mm. particles, and primarily with the 0.5–1 mm. particles, at temperatures of approximately 10–15° C. in excess of those mentioned above.

Working up of the synthesis product formed showed that the yield of oxygenated compounds obtained with the 0.5–1 mm. particles was about 20 percent higher than that obtained with the 2–3 and 3–4 mm. particles.

I claim:

1. In the process for the catalytic hydrogenation of carbon monoxide, the improvement which comprises passing a carbon monoxide hydrogen containing synthesis gas at a pressure above 5 atmospheres in contact with a fixed bed of precipitated iron catalyst obtained by precipitation from an iron salt solution having a particle size of 0.5–1.9 mm. diameter and an alkali content of 5–15 parts alkali, calculated as $K_2O$ per 100 parts by weight iron, said catalyst being reduced at a temperature between 200 and 350° C. with linear gas flow velocities of at least 60 cm. per second measured cold, and recovering synthesis products containing at least 30% oxygenated compounds.

2. Improvement according to claim 1, in which said catalyst has a substantially uniform particle size.

3. Improvement according to claim 1, in which said contacting is effected at a pressure above 10 atmospheres.

4. Improvement according to claim 1, in which said catalyst contains 5 to 8.5 parts alkali calculated as $K_2O$ per 100 parts by weight iron.

5. Improvement according to claim 1, in which said catalyst has a particle size between 0.5 and 1.0 mm. diameter.

6. Improvement according to claim 1, in which said contacting is effected with a catalyst load of at least 10 liters of gas per liter of catalyst per hour.

7. Improvement according to claim 1, in which said contacting is effected by passing synthesis gas upward through the catalyst bed.

References Cited in the file of this patent

UNITED STATES PATENTS

| | | |
|---|---|---|
| 2,560,344 | Hemminger | July 10, 1951 |
| 2,567,296 | Milligan et al. | Sept. 11, 1951 |
| 2,660,599 | Rottig | Nov. 24, 1953 |
| 2,698,335 | Sumerford | Dec. 28, 1954 |

FOREIGN PATENTS

| | | |
|---|---|---|
| 528,617 | Great Britain | Nov. 1, 1940 |

OTHER REFERENCES

U. S. Naval Technical Mission Report, No. 248–45 (1946), pages 73–84.

Storch: "The Fischer-Tropsch and Related Synthesis," John Wiley & Sons, New York, 1951, pages 288 and 289.